United States Patent
Choo et al.

(10) Patent No.: US 9,052,450 B2
(45) Date of Patent: Jun. 9, 2015

(54) NANO-FABRICATED PLASMONIC OPTICAL TRANSFORMER

(75) Inventors: Hyuck Choo, Albany, CA (US); Stefano Cabrini, Albany, CA (US); P. James Schuck, Berkeley, CA (US); Xiaogan Liang, Berkeley, CA (US); Eli Yablonovitch, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 203 days.

(21) Appl. No.: 13/083,228

(22) Filed: Apr. 8, 2011

(65) Prior Publication Data

US 2011/0249546 A1     Oct. 13, 2011

Related U.S. Application Data

(60) Provisional application No. 61/322,121, filed on Apr. 8, 2010.

(51) Int. Cl.
| | |
|---|---|
| *G11B 5/02* | (2006.01) |
| *G02F 1/035* | (2006.01) |
| *G11B 5/127* | (2006.01) |
| *G11B 11/00* | (2006.01) |
| *G02B 6/122* | (2006.01) |
| *B82Y 20/00* | (2011.01) |

(Continued)

(52) U.S. Cl.
CPC ....... *G02B 6/1226* (2013.01); *Y10T 428/24612* (2015.01); *Y10T 29/49826* (2015.01); *B82Y 20/00* (2013.01); *G11B 7/1387* (2013.01); *G11B 7/22* (2013.01)

(58) Field of Classification Search
CPC ........... G11B 2005/0021; G11B 5/314; G11B 5/6088; G11B 7/1387; G11B 2005/0005; G11B 2005/001; G11B 5/02; G11B 5/3116; G11B 11/10536; G11B 5/4866; G11B 5/3163; G11B 2005/0002; G11B 5/127; G11B 7/122; G11B 7/22; B82Y 20/00; G02B 6/1226
USPC ................. 369/112.18, 112.01, 112.8, 44.12, 369/44.14; 29/428, 602.1, 603.01; 356/301–305; 428/172; 216/24, 67, 72, 216/79; 324/96, 127
See application file for complete search history.

(56) References Cited

U.S. PATENT DOCUMENTS

| | | | | |
|---|---|---|---|---|
| 5,992,326 | A | * | 11/1999 | Martinez-Tovar et al. 102/202.4 |
| 7,418,179 | B2 | * | 8/2008 | Estes et al. .................... 385/130 |

(Continued)

OTHER PUBLICATIONS

Vedantam et al., "A Plasmonic Dimple Lens for Nanoscale Focusing of Light", Nano Letters, vol. 9, No. 10, 3447-3452 (2009).

(Continued)

*Primary Examiner* — Wayne Young
*Assistant Examiner* — Dionne Pendleton
(74) *Attorney, Agent, or Firm* — Lawrence Berkeley National Laboratory

(57) ABSTRACT

The present invention provides a plasmonic optical transformer to produce a highly focuses optical beam spot, where the transformer includes a first metal layer, a dielectric layer formed on the first metal layer, and a second metal layer formed on the dielectric layer, where the first metal layer, the dielectric layer, and the second layer are patterned to a shape including a first section having a first cross section, a second section following the first section having a cross-section tapering from the first section to a smaller cross-section, and a third section following the second section having a cross-section matching the tapered smaller cross-section of the second section.

28 Claims, 3 Drawing Sheets

(51) Int. Cl.
*G11B 7/1387* (2012.01)
*G11B 7/22* (2006.01)

(56) References Cited

U.S. PATENT DOCUMENTS

| | | | |
|---|---|---|---|
| 8,094,523 B2* | 1/2012 | Kamijima et al. | 369/13.33 |
| 8,233,358 B2* | 7/2012 | Zhou et al. | 369/13.33 |
| 8,760,809 B1* | 6/2014 | Sasaki et al. | 360/125.31 |
| 2004/0184384 A1* | 9/2004 | Spoonhower et al. | 369/112.24 |
| 2008/0278168 A1* | 11/2008 | Weiss et al. | 324/322 |
| 2010/0226608 A1* | 9/2010 | Chen et al. | 385/28 |
| 2011/0205661 A1* | 8/2011 | Komura et al. | 360/59 |
| 2011/0216634 A1* | 9/2011 | Chou et al. | 369/13.24 |

OTHER PUBLICATIONS

Shantha Vedantam et al., "Nanoscale Fabrication of a Plasmonic Dimple Lens for Nano-focusing of Light", Proc. SPIE, vol. 6641, Plasmonics: Metallic Nanostructures and Their Optical Properties V, 66411J-1 (Sep. 25, 2007).

Shantha Vedantam et al., "A Plasmonic Dimple Lens for Nanoscale Focusing of Light", Nano Letters, vol. 9, No. 10, pp. 3447-3452, (2009).

W. A. Challener et al., "Heat-assisted magnetic recording by a near-field transducer with efficient optical energy transfer", Nature Potonics, vol. 3 220, (Apr. 2009).

* cited by examiner

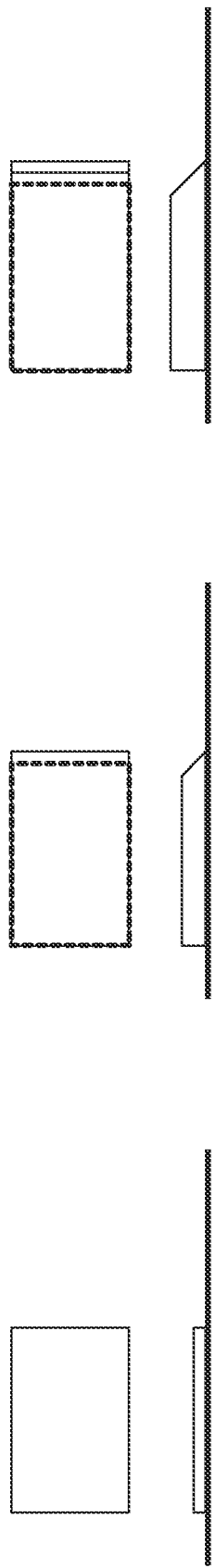
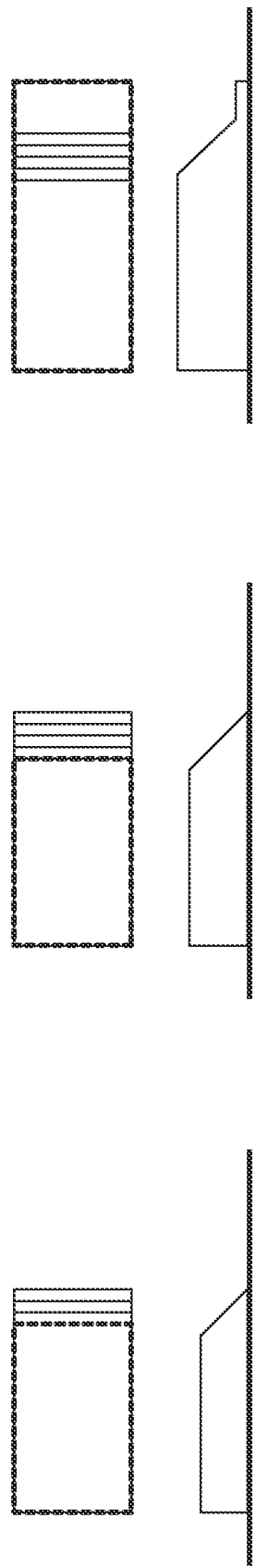

NANO-FABRICATED PLASMONIC OPTICAL TRANSFORMER

RELATED APPLICATIONS

The application claims priority to U.S. Provisional Patent Application Ser. No. 61/322,121, filed Apr. 8, 2010, which is herein incorporated by reference in its entirety.

STATEMENT OF GOVERNMENTAL SUPPORT

This invention was made with government support under Contract No. DE-AC02-05CH11231 awarded by the U.S. Department of Energy and under Defense Advanced Research Projects Agency (DARPA) Grant Number FA9550-08-1-0257 awarded by the Air Force Office of Scientific Research. The government has certain rights in the invention.

FIELD OF THE INVENTION

The present invention relates to the field of optics, and more particularly to devices and methods of fabrication to produce a highly focuses optical beam spot.

BACKGROUND OF THE INVENTION

Previous efforts to fabricate optical devices capable of reducing an optical beam spot to dimensions below the classical diffraction limit (on the order of half the wavelength of the illuminating beam, e.g., 200-400 nm) to the sub-100 nm scale have used or considered photo-assisted scanning tunneling microscopy (STM), tapered plasmonic wires, enhanced transmission apertures and tapered optical fiber probes. These approaches change the effective wavenumber of the light wave propagation mode to reduce the dimensional characteristics of the guided electromagnetic wave— e.g., a surface plasmon. In so doing, the photon electric field can be confined in a smaller spatial region well below the diffraction limit. Advantages of such small and concentrated optical spots include the abilities to read and write higher density of data to optical and magnetic storage devices, to conduct single molecule Raman spectroscopy, to achieve sub-diffraction-limited microscopy, to realize optical logic arrays using novel optical switches, and to build highly sensitive detector arrays. However, devices so far developed using such approaches have been highly inefficient. Due to the intrinsic scattering, absorption, and/or resistive heating, transporting photons from the micro-scale and confining them into a 100-nm-diameter spot can result in 20-60 dB loss, depending on technique used. Losses of this magnitude, which increases even more dramatically as the spot size becomes smaller than 100 nm, makes it very challenging to implement the applications mentioned above.

SUMMARY OF THE INVENTION

A plasmonic optical transformer and method of making is described. The optical transformer is an impedance transformer at optical frequencies. That is, propagating photons (characterized, for example, by velocity of wave propagation, wavenumber and electromagnetic field density) are coupled into surface plasmons (which are a collection of oscillating electrons coupled to a propagating electromagnetic field that still possess characteristics of the original photons) that are transformed by propagation down a tapered waveguide fabricated at nano-scale dimensions. A waveguide having a gradually decreasing vertical layer of transparent dielectric (e.g., $SiO_2$, air, vacuum) or equivalent dielectric insulator sandwiched between two metal layers and having a decreasing horizontal width of the dielectric-metal sandwich structure, ending in a tip with the dielectric layer thinned down to about 15-20 nm, forms the optical impedance transformer structure. The minimum thickness and width of the dielectric layer may be greater or less, and the values of 15-20 nm are given only for representative purposes.

The plasmonic optical transformer includes a first metal layer, a dielectric layer formed on the first metal layer, and a second metal layer formed on the dielectric layer. The first metal layer, the dielectric layer, and the second layer are patterned to a shape including a first section having a dielectric layer first area cross-section, a second section following the first section having a dielectric layer area cross-section tapering from the first section to a smaller area cross-section, and a third section following the second section having a dielectric layer area cross-section matching the tapered smaller area cross-section of the second section.

The surface plasmon, also referred to as a plasmonic photon, is a propagating wave obeying a solution to Maxwell's Equations along the boundary between two media with dielectric constants of opposite sign, e.g., between a transparent insulating oxide, air or vacuum, and a metal. In a sandwiched structure such as metal-insulator-metal, the electric field distribution of the wave is characterized by an amplitude maximum at each metal-insulator boundary, and exponential decay in the metal with distance from the boundary. In the insulator region of the sandwich structure, the electric field amplitude is a hyperbolic function, satisfying field intensity and first derivative continuity. As the insulator dimension decreases, the wavelength of the propagating mode decreases accordingly, and the electromagnetic mode energy is confined to a space much smaller than the wavelength of a free space propagating photon. At the end of such a sandwich waveguide, the energy is an evanescent fringing field that couples to a free-space photon, but from a much smaller spot size.

Methods of coupling a conventional laser beam into an optical transformer as describe can be found, for example, in S. Vedantam, et al., "A Plasmonic Dimple Lens for Nanoscale Focusing of Light," Nano Letters 2009 9 (10), 3447-3452, incorporated herein by reference in its entirety, in which a laser beam is directed laterally at a diffraction grating formed in a structure preceding the first section, described above, to couple the incident radiation into a single sided surface plasmon before entering the first section.

The foregoing has outlined rather broadly the features and technical advantages of the present disclosure in order that the detailed description of the embodiments that follow may be better understood. Additional features and advantages of the embodiments will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization, method of fabrication, and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments of the disclosure.

BRIEF DESCRIPTION OF THE DRAWINGS

For a more complete understanding of the present disclosure, reference is now made to the following descriptions taken in conjunction with the accompanying drawings.

FIGS. 4A-4F show a succession of steps in the fabrication of the dielectric layer of the optical transformer of FIG. 1A.

DETAILED DESCRIPTION OF THE INVENTION

Figure 1A:
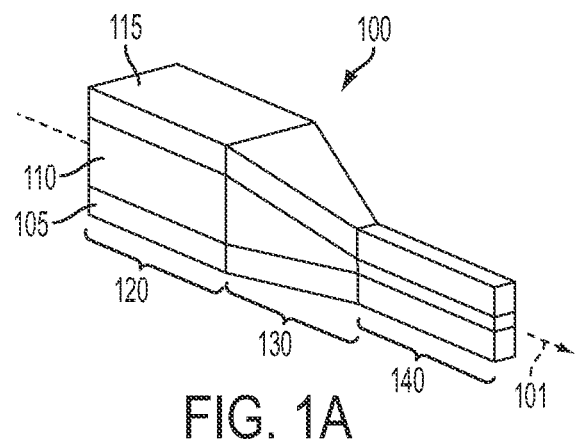
FIG. 1A shows an embodiment in perspective of a plasmonic optical transformer 100 in accordance with the disclosure.
Figure 1B:
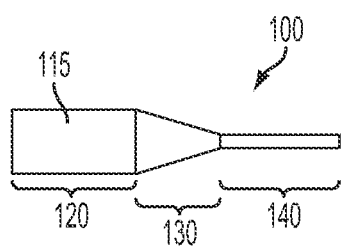
FIG. 1B shows a top view of the transformer of FIG. 1A.
Figure 1C:
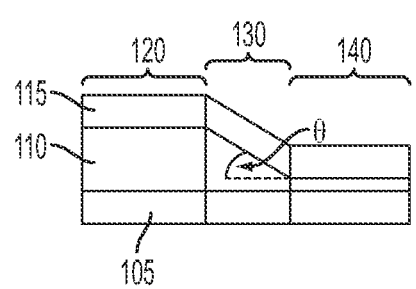
FIG. 1C shows a side view of the transformer of FIG. 1A.
Figures 2A, 2B, 2C, 2D:
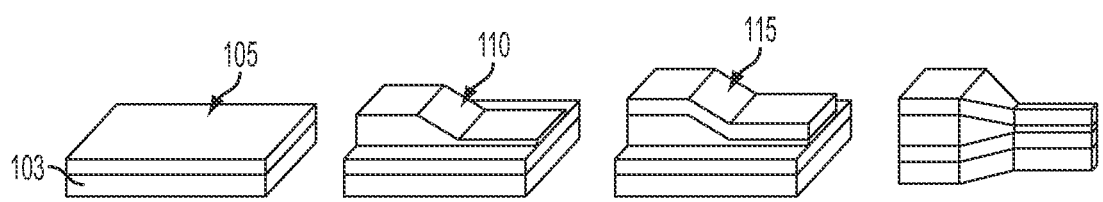
FIGS. 2A-2D shows intermediate stages of an embodiment of the fabrication process of making the optical transformer of FIG. 1A.
Figure 3:
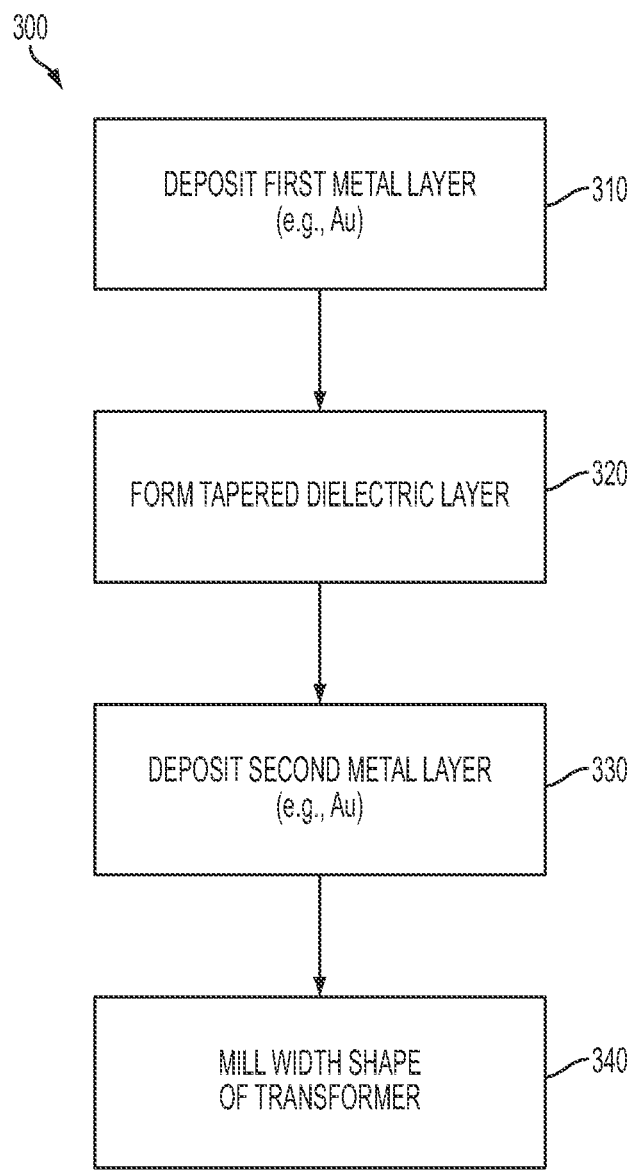
FIG. 3 is a process flow showing the steps of fabricating the optical transformer of FIGURE

FIG. 1A shows an embodiment in perspective of a plasmonic optical transformer 100 in accordance with the disclosure. Plasmonic photons propagate along an optical axis 101. FIG. 1B shows a top view of the transformer 100 of FIG. 1A. FIG. 1C shows a side view of the transformer 100 of FIG. 1A. Electron-beam induced deposition and focused ion milling techniques may be included in various processes used to fabricate the plasmonic optical transformer at nano-scale dimensions. FIGS. 2A-2D show steps of an embodiment of the fabrication process for making the optical transformer 100. FIG. 3 shows a process flow 300 of steps included for fabricating the optical transformer 100. In this embodiment, referring to FIGS. 1, 2 and 3, transformer 100 includes a first metal layer (e.g., Au, Ag, Cu, Al, or an equivalent high conductivity metal) 105 of approximately 50 nm thickness deposited on a substrate 103, as shown in FIG. 2A and process block 310. Metal layer 105 may be thicker or thinner. However, Au has desirable conductive and chemical stability properties, which are well recognized in the electronics industry.

A dielectric layer 110 is deposited using electron-beam induced deposition, as shown in FIG. 2B (process block 320). The dielectric layer 110 may be $SiO_2$, however other material choices are available to tailor the index of refraction of the dielectric layer 110 for particular transformer characteristics. Other examples of material choice are $SiO_x$, where the stoichiometry of oxygen is varied, and may include stoichiometric combinations of $Si_3N_4/SiO_x$, and the like. Other examples of dielectric layer 110 include, air, vacuum, and polymer. Any insulating, optically low loss medium may be suitable.

The tapering geometry may be achieved by controlling the scanning deposition area, scanning rate, and dose of the electron beam and by performing multi-layer deposition scans (further described below with reference to FIGS. 4A-4F). Successive layers of appropriately varying length along the propagation direction 101 results in a terraced stacking of layers that produces the desired tapering geometry. Using the selective electron-beam induced deposition process, a taper angle θ between about 5 and 45 degrees and deposited layers as thin as 5 nm are obtainable, but the taper angle θ and layer thicknesses may be greater or smaller. The taper angle θ may be as great as 90 degrees, however, for an adiabatic transformation, in order to reduce optical toss, the taper angle θ may preferably be 45 degrees or less.

Following the deposition of dielectric layer 110, a second metal layer 115, such as Au, Ag, Cu, Al, or an equivalent high conductivity metal, which may be approximately 50 nm thick (but which may be thicker or thinner) is deposited over the dielectric layer 110, as shown in FIG. 2C (and process block 330).

The final width shape of the optical transformer 100, as shown in FIG. 2D (process block 340), may be defined by high resolution techniques such as focused ion-beam milling. The optical transformer is characterized by having three regions: an excitation first section 120, a transformer second section 130, and a tip third section 140. In operation, light such as laser light may be coupled into the excitation first section 120 using, for example, a fiber optic coupler, a grating or prism coupler. The thickness of the dielectric layer 110 in the excitation first section 120 between the Au layers 105, 115 may be on the order of 100 nm, but may be thicker or thinner. The thickness of the dielectric layer 110 in the transformer second section 130 tapers from the thickness in the excitation first section 120 to the thickness in the tip third section 140. The focused ion-milling step tapers the width of the taper second section 130 from the width of the excitation first section 120 to the width of the tip third section 140.

The boundary conditions that govern the properties of the surface plasmons (I.e., plasmonic photons) requires that the polarization of the propagating mode be polarized TM, i.e., the electric field is perpendicular to the metal layers 105, 115. Therefore, the photon beam coupled into the excitation region must have the correct polarization to properly excite the TM plasmonic mode.

FIGS. 4A 4F show a succession of steps in the fabrication of the dielectric layer 110. In FIG. 4A a first intermediate layer of dielectric material is formed and patterned, for example, by selective ion-assisted deposition with a first length in the direction of the intended direction of photon propagation and a first width. FIG. 4B shows a second intermediate layer of dielectric material deposited and patterned with a shorter dimension in the propagation direction to create a terraced effect in building up the tapering transformer region 130 of the waveguide. FIGS. 4C-4E show successive layers of dielectric material deposited to create the tapered (thickness) cross-section. FIG. 4F shows a final layer deposited and patterned to produce a layer that may be on the order of 15 nm thick, representative of the vertical thickness of the dielectric layer in the tip 140 of the transformer 100, completing the formation of dielectric layer 110. The order in which the intermediate and final dielectric layers are formed may vary. For example, the steps illustrated in FIGS. 4A-4E may be reversed. The reversal of the deposition steps described may result in a smoother tapering of the thickness of the dielectric layer 110.

Focused ion-beam (FIB) milling is an exemplary process for removing specified regions of the second metal layer 115, the dielectric layer 110 and, if specified, the first metal layer 105. Other methods that perform the equivalent removal processes are considered within the scope of the disclosure. The finished device may have more than one final appearance. In one embodiment, portions of the metal layer 105 and the substrate 103 may be left intact by the focused ion milling process (or a process substantially equivalent) to provide a region for "handling" the transformer 100 during device assembly. In another embodiment, the substrate may be sacrificial, or a portion of it may include a sacrificial layer, for example, adjacent to metal layer 105 so that the device may be separated from the substrate 103.

An optimized taper angle θ resulting in a minimum of propagation loss through the transformer 100 may be determined by modeling, which depends on dimensions and optical properties of the metal and dielectric layers. In one simulation example, with metal layers 105, 115 of 50 nm thick Au, a dielectric layer 110 of $SiO_2$ 100 nm thickness in excitation first section 120, tapering in the transformer second section 130 to 20 nm thick in the tip third section 140, where the dielectric is $SiO_2$, the optimum taper angle θ is about 30 degrees for minimum optical energy loss in the transformer 100.

In the foregoing embodiment, the taper angle θ is assumed to be constant. However, in an other embodiment, the electron beam assisted deposition of dielectric layer 110 may be controlled to provide a variable taper angle θ where the angle θ is varied over a range from zero degrees to a maximum specified angle, e.g., 45 degrees, to make the optical impedance transformation more continuous, further reducing propagation loss.

Compared to a surface plasmon generated on a gold surface with a peak-to-peak roughness of 8 nm, calculations and preliminary experiments indicate that, depending on details of dimensions and material choices, the transformer 100 is capable of a relative electric field mode enhancement of at least a factor of 1500, and potentially more, while reducing the optical beam spot to dimensions of less than 15 nm-20 nm.

One may readily appreciate the advantages of the optical transformer as described above. For example, as a read/write head in optical media, the spot size is smaller by an order of magnitude or more, enabling data densities of potentially 1-50 terabits/$in^2$, whereas current technology is expected to saturate at about 1 terabits/$in^2$. As another example, various forms of spectroscopy, such as Raman spectroscopy, may be carried out at the single molecular level. The advantages of optical probing at such nanoscale levels are thus readily appreciated.

Mass production of the optical transformer may be readily achieved by a batch process including the steps of (1) creating a plurality of the tapered dielectric structure on a first substrate using electron-beam-induced deposition, (2) creating a master mold of the plurality of the tapered structures, (3) separate the mold for later use, (4) begin batch fabrication by depositing the first metal layer on a second substrate, (5) coat the first metal layer with a deformable dielectric layer suitable for nano-imprinting, (6) press the mold into the dielectric layer with suitable force, (7) remove the mold, (8) remove unwanted dielectric using, for example, oxygen plasma etch or reactive ion etch (RIE) techniques to expose the first metal layer around the defined tapered dielectric structure, (9) deposit the second metal layer, (10) selectively deposit/pattern diamond or a suitable masking layer over the second metal in the regions defined by the tapered dielectric structure, (11) remove exposed metal at least down to the second substrate, and (12) remove the masking layer by suitable means, leaving the remaining second metal layer exposed. One may readily appreciate that variants of the above described process may be employed to batch fabricate the optical transformer having substantially the same final shape and characteristics, but in large quantities.

Conclusion

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the embodiments of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An optical transformer comprising:
   a first metal layer;
   a dielectric layer disposed on the first metal layer, the dielectric layer being in a shape comprising:
   a first section having a first thickness of about 100 nanometers and a first width,
   a second section coupled to the first section having a tapering thickness tapering at a thickness taper angle θ from the first thickness to a smaller thickness of about 15 nanometers to 20 nanometers and having a tapering width from the first width to a smaller width, and
   a third section having the smaller thickness and the smaller width coupled to the second section; and
   a second metal layer disposed on the dielectric layer.

2. The optical transformer of claim 1 wherein the first metal layer comprises at least one of Au, Ag, Cu, Al, and a high conductivity metal.

3. The optical transformer of claim 1 wherein the first metal layer is approximately 50 nanometers thick.

4. The optical transformer of claim 1 wherein the dielectric layer comprises at least one of a polymer, SiO2, SiO, SiOx, and Si3N4, where x is a non-integer number.

5. The optical transformer of claim 1 wherein the thickness taper angle θ is between about 5 degrees and 90 degrees.

6. The optical transformer of claim 1 wherein a thickness of the dielectric layer in the second section varies from the first thickness to the smaller thickness.

7. The optical transformer of claim 1 wherein the first width is about 100 nanometers, wherein the smaller width is about 15 nanometers to 20 nanometers, and wherein a width of the second section varies from the first width to the smaller width.

8. The optical transformer of claim 1 wherein the thickness tapering angle θ varies over a range from 0 degrees to a specified value.

9. A method of making an optical transformer comprising:
   providing a first metal layer;
   forming a dielectric layer on the first metal layer, the dielectric layer being in a shape comprising:
   a first section having a first thickness of about 100 nanometers and a first width,
   a second section coupled to the first section having a tapering thickness tapering at a thickness taper angle θ from the first thickness to a smaller thickness of about 15 nanometers to 20 nanometers and having a tapering width from the first width to a smaller width, and
   a third section having the smaller thickness and the smaller width coupled to the second section; and
   forming a second metal layer on the dielectric layer.

10. The method of claim 9 wherein the first metal layer comprises at least one of Au, Ag, Cu, Al, and a high conductivity metal.

11. The method of claim 9 wherein the first metal layer is approximately 50 nanometers thick.

12. The method of claim 9 wherein the dielectric layer comprises at least one of a polymer, SiO2, SiO, SiOx, and Si3N4, where x is a non-integer.

13. The method of claim 9 wherein forming the dielectric layer includes forming the tapering thickness in the dielectric layer in the second section by a selective electron-beam induced deposition process.

14. The method of claim 9 wherein the thickness taper angle θ is between about 5 degrees and 90 degrees.

15. The method of claim 9 wherein forming the dielectric layer includes forming the dielectric layer such that a thickness of the dielectric layer in the second section varies from the first thickness to the smaller thickness.

16. The method of claim 9 wherein the first width is about 100 nanometers, wherein the smaller width is about 15 nanometers to 20 nanometers, and wherein a width of the second section varies from the first width to the smaller width.

17. The method of claim 9 further comprising:
patterning the widths of the optical transformer by focused ion beam milling.

18. The method of claim 9 wherein the thickness tapering angle θ is variable over a range from 0 degrees to a specified value.

19. The optical transformer of claim 1 wherein the optical transformer is associated with an optical read/write device configured to write and/or read data from an optical storage medium.

20. The optical transformer of claim 1 wherein the optical transformer is configured to read and write data to and/or from an optical storage medium by coupling a light signal to the optical storage medium.

21. The optical transformer of claim 1 wherein the optical transformer is associated with a device configured to perform optical spectroscopy.

22. The optical transformer of claim 1 wherein the second metal layer comprises at least one of Au, Ag, Cu, Al, and a high conductivity metal.

23. The optical transformer of claim 1 wherein the second metal layer is approximately 50 nanometers thick.

24. The method of claim 9 wherein the second metal layer comprises at least one of Au, Ag, Cu, Al, and a high conductivity metal.

25. The method of claim 9 wherein the second metal layer is approximately 50 nanometers thick.

26. The optical transformer of claim 1 wherein a thickness of the first metal layer is substantially uniform, and wherein a thickness of the second metal layer is substantially uniform.

27. The method of claim 9 wherein a thickness of the first metal layer is substantially uniform, and wherein a thickness of the second metal layer is substantially uniform.

28. An optical transformer comprising:
a first metal layer;
a dielectric layer disposed on the first metal layer, the dielectric layer being in a shape comprising:
a first section having a first thickness and a first width of about 100 nanometers,
a second section coupled to the first section having a tapering thickness tapering at a thickness taper angle θ from the first thickness to a smaller thickness and having a tapering width from the first width to a smaller width of about 15 nanometers to 20 nanometers, a width of the second section varying from the first width to the smaller width, and
a third section having the smaller thickness and the smaller width coupled to the second section; and
a second metal layer disposed on the dielectric layer.

* * * * *